United States Patent

Hehl

[15] 3,697,812
[45] Oct. 10, 1972

[54] AUTOMATIC SAFETY SWITCH FOR ELECTRIC CURRENT LOAD

[72] Inventor: Karl Hehl, Siedlung 183, D 7291 Lossburg, Germany

[22] Filed: April 8, 1971

[21] Appl. No.: 132,508

[30] Foreign Application Priority Data

April 11, 1970 Germany..........P 20 17 422.5

[52] U.S. Cl. ..............317/33 SC, 219/501, 317/40 R
[51] Int. Cl. ................................................H02h 7/00
[58] Field of Search ..........307/92, 94, 310; 219/501; 317/33 SC, 40 R

[56] References Cited

UNITED STATES PATENTS

| | | | |
|---|---|---|---|
| 1,866,371 | 7/1932 | Prince | 317/11 E |
| 3,225,280 | 12/1965 | Happe et al. | 306/310 X |
| 3,324,352 | 6/1967 | Hover | 307/310 X |
| 3,379,939 | 4/1968 | Obenhaus | 307/310 X |
| 3,564,206 | 2/1971 | Lauck | 219/501 |

*Primary Examiner*—Bernard A. Gilheany
*Assistant Examiner*—Fred E. Bell
*Attorney*—Spencer & Kaye

[57] ABSTRACT

An automatic safety circuit for monitoring the power switching means controlling the main current circuit to an electric power load to automatically cut off the current in the event of a malfunction of the power switching means which causes it to continue to remain in its closed condition. The auxiliary switching circuit includes a switching arrangement for selectively disrupting the main current circuit, and an auxiliary switch controlled by the same member or circuit which controls the main power switching means for establishing a current path between the switching arrangement and a point in the main current circuit between the load and the main power switching means whenever the main current to the load is to be switched off.

12 Claims, 5 Drawing Figures

PATENTED OCT 10 1972

INVENTOR.
Karl Hehl
BY Spencer & Kaye
ATTORNEYS.

3,697,812

AUTOMATIC SAFETY SWITCH FOR ELECTRIC CURRENT LOAD

BACKGROUND OF THE INVENTION

The present invention relates to an automatic safety switch for monitoring the power switching member of an electric current load, such as, for example, an electric heater, a motor, or the like. This safety switch functions to prevent damages which would otherwise result from a malfunction of the power switching member controlling the main current circuit when it is switched off.

It is known to connect a second power switching member in series with a first power switching member in a safety circuit of this type, so that the main current circuit is switched off when the last-mentioned power switching member malfunctions during the switch-off. Such a safety circuit however requires a separate control circuit.

SUMMARY OF THE INVENTION

It is an object of the present invention to eliminate this additional control circuit and to provide a safety circuit of the above-mentioned type which is easier to fabricate, is simpler and, thus, less expensive, and which protects the electric current load against damages when the power switching member remains conductive either because it is, for example, burned out because of a mechanical defect, or the like.

This and other objects are accomplished according to the present invention in that a safety circuit of the type in question is provided by connecting an auxiliary switching member, either electrically or mechanically, so that it operates in synchronism with the control for the power switching member and establishes an electrical connection to a point in the main current circuit between the electric current load and the power switching member only when the power switching member is controlled or switched to its off condition. A device for separating or disrupting the main current circuit when it is subjected to the voltage or current of the main current circuit is electrically connected with the auxiliary switching member so that in the event of a malfunction of the power switching member causing it to remain conductive, power will be applied to the device.

Advisably, a device according to the present invention has at least a resistance heating element and a heatable switching element in thermal contract with the heating element. This switching element cuts off the main current circuit when a predetermined temperature inherent to the particular material or materials used is exceeded.

A number of different embodiments of the invention are disclosed utilizing different types of power switching members. For example according to one embodiment the power switching member is an electronic device directly connected in the main current circuit while according to another embodiment of the invention the power switch member is a relay having a pair of contacts in the main current circuit and a relay coil connected in an auxiliary power circuit.

According to a further feature of the invention, control of the power switching member and auxiliary switching member may be by manual means or by an automatic control circuit.

DESCRIPTION OF THE PREFERRED EMBODIMENTS

Figure 1:
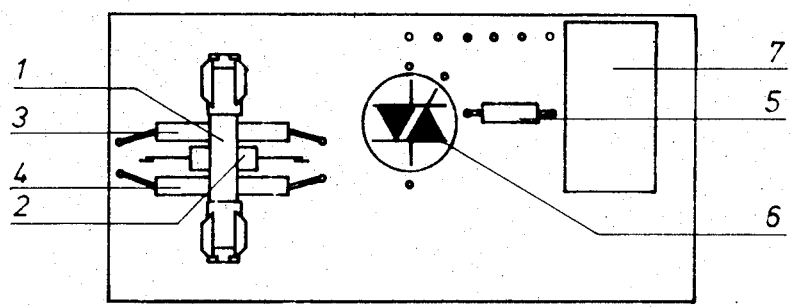
FIG. 1 is a schematic top plan view showing a safety circuit according to the present invention having an electronic power switching member.
Figure 2:
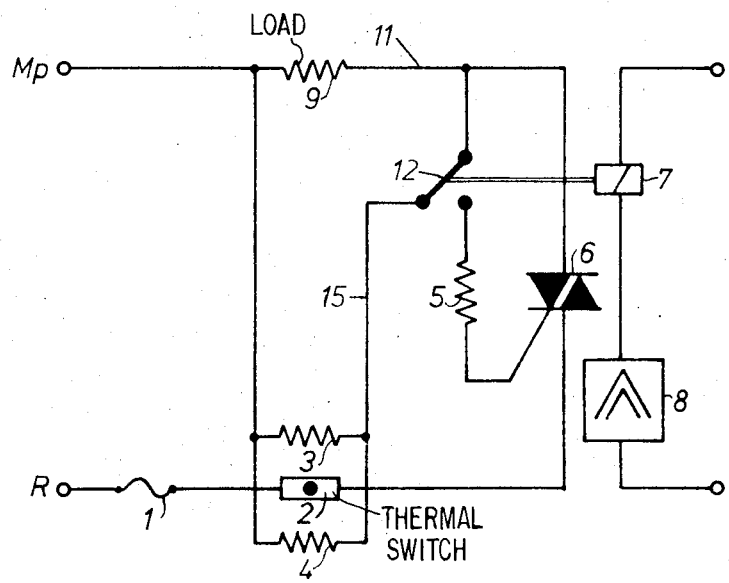
FIG. 2 is a schematic circuit diagram of the safety circuit of FIG. 1.

Referring now to the drawings, wherein like elements are indicated by the same reference numerals in all figures, FIGS. 1 and 2 show a load 9 which is held at a predetermined temperature by an electronic temperature control device. This temperature control device has a suitable amplifier 8 which in a known manner monitors the temperature at the heated load 9. Amplifier 8 controls a suitable, known relay 7 which together with amplifier 8 forms an amplifier circuit. Depending on whether the temperature of load 9 is above or below the predetermined value, relay 7 with the aid of its switch contacts 12 switches either on or off a suitable, known power switching member 6. This switching member 6 controls a main current circuit 11 which is provided with a suitable fuse 1.

In the embodiment of FIGS. 1 and 2 of the drawings, the electronic power switching member 6 is arranged directly in the main current circuit 11 and is controlled in a known manner by relay 7 via a suitable resistor 5.

Member 6 may be, for example, a suitable known thyristor, such as that sold by General Electric under the trade name "TRIA." With this arrangement, the thyristor 6 is supposed to be switched to its non-conducting state when the switch contacts 12 are in the illustrated position, and to its conducting condition when the switch contacts 12 are in the position where the resistor 5 is coupled to the main circuit via the lead 14. It is to be understood, however, that other arrangements for obtaining the triggering voltage for thyristor 6 may be utilized.

An important component of the automatic safety circuit according to the invention is the electrical connection 14 between the switch contacts 12 and a point on the main current circuit 11 located between the load 9 and the power switching member 6. The remainder of the automatic safety circuit according to the invention is a device 2,3,4 which is disposed in the main current circuit 11 and is electrically connected with switch contacts 12 of relay 7 via a line 15. When the switch contacts 12 are in their normally open condition as shown, the device 2,3,4, is effectively connected via the line 14 so that it is in parallel with the load 9.

The device 2,3,4, which functions to interrupt the main current circuit 11 when it is subjected to a current from the main circuit 11, may take any suitable form which will perform this function. As illustrated, the device 2,3,4, preferably comprises a heat responsive switch 2 which is directly connected in the main current circuit 11 on the side of the power switching member 6 opposite that to which the load is connected and which is in thermal contact with at least one and preferably two heating elements 3,4 which are connected to the switching contacts 12. Elements 3 and 4 may be, for example, suitably known resistance heating elements, while element 2 may be any well known thermal switching arrangement which is capable of handling the required power. The element 2 may, for example, operate on a chemical basis in a known manner. In this case the element comprises a switch, which is held in closed position by a spring and opens if the pressure of the spring is eliminated. The abutment for the spring is a block, which is decomposed into a powder if the temperature rises over a predetermined limit.

With the illustrated circuit arrangement, if, as a result of a malfunction, the power switching member 6 remains conductive even after the auxiliary relay 7 has caused the switching contacts 12 to assume the illustrated position, a completed circuit will result from phase R to phase Mp of the main current circuit 11 via line 14, switching contact 12 of relay 7, line 15 and elements 3 and 4. The application of current to elements 3,4 heats switching element 2 until a predetermined limit temperature is exceeded. Element 2 cuts off the main current circuit 11 because of this exceeded limit and, thus, interrupts the current flow to the electric current load 9. The device consisting of elements 3 and 4 and switching element 2 may also be provided in the form of an electromechanical switching number (not shown). Such a switching member switches off the main current circuit 11 whenever it receives current through line 14, contact 12 and line 15. In any case, the main current circuit 11 is interrupted by the safety circuit only when, in spite of a switched-off auxiliary relay 7, or auxiliary switching member, power switching member 6 remains conductive.

A temperature-dependent device 2,3,4 having elements 3,4 and a switching element 2 operating on, for example, a chemical basis and which is substantially smaller and more economical in comparison with an electromechanical switching member is to be preferred over the latter (not shown) when it is important to have a compact design for the safety switch, or to provide a permanent switch-off.

Figure 3:
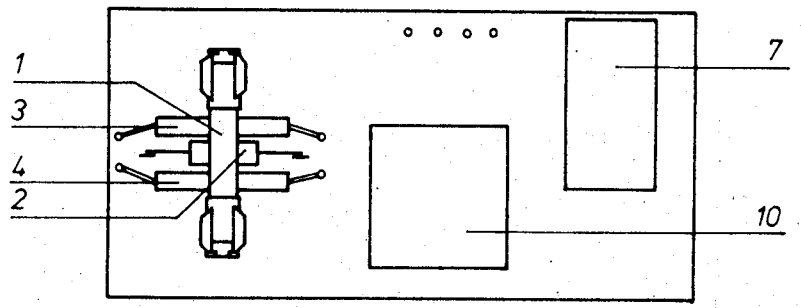
FIG. 3 is a schematic top plan view showing a safety circuit according to the present invention having an electromechanical power switching member.
Figure 4:
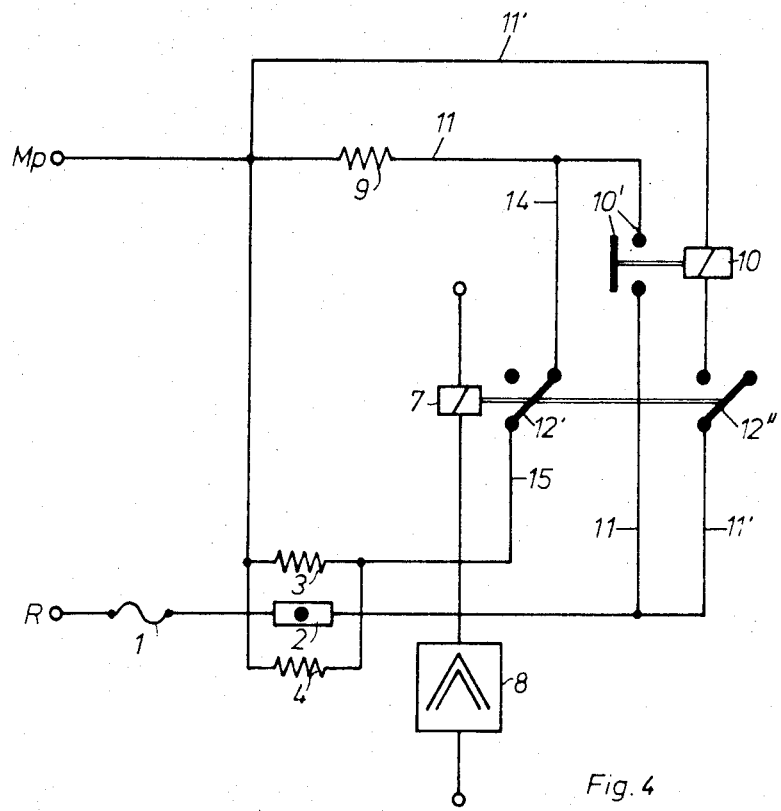
FIG. 4 is a schematic circuit diagram of the safety circuit of FIG. 2.

Instead of the thyristor or electronic power switching member 6 connected directly in the main current circuit 11 as shown in FIGS. 1 and 2, as shown in FIGS. 3 and 4, an electromechanical power switching member may be utilized. According to this embodiment only the relay contacts 10' of the power switching member are disposed in the main current circuit 11 and the relay coil therefore is disposed in an auxiliary power circuit 11 which is connected in parallel with the load 9 and the contacts 10'. In this case, the relay 7 is provided with two pairs of switching contacts, one of which 12" is connected in the circuit 11' and serves to control the relay coil 10, while the other pair of switching contacts 12' serves to make the connection between lead 14 and lead 15 when the contacts 10' are to be switched to their open condition. In the event of a malfunction of the relay coil 10 or of the contacts 10' causing the contacts 10' to remain closed even though the relay 7 has been switched by the amplifier 8 so that the contacts 12' are in the illustrated position, current will be supplied to the resistance heating elements 3 and 4 causing switch element 2 to interrupt the main current circuit in the same manner with the circuit of FIG. 2.

Figure 5:
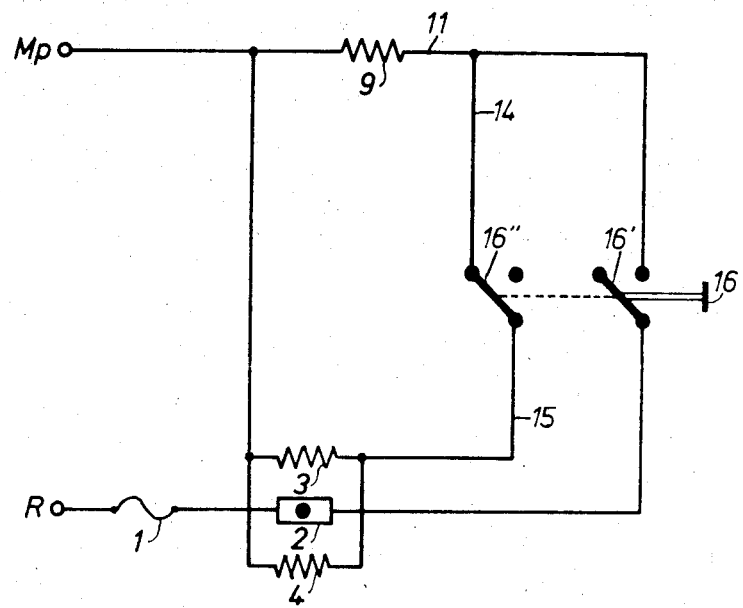
FIG. 5 is a schematic circuit diagram of a safety circuit according to the present invention with a manually actuated power switching member.

The safety switch according to the present invention may also be of significance when the electric current load 9 is, for example, a heater and the predetermined temperature of the heater is not maintained by a temperature control device, but rather by a person controlling the heater by means of a manual switch. In this case (FIG. 5), a power switching member 16 having a pair of switching contacts 16' connected directly in the main current circuit 11 is provided. The member 16 is to be operated manually by a person monitoring or operating the electric current load 9 and is connected mechanically or electrically with an auxiliary switching member 16". In the event of malfunction of power switching contacts 16', during switch-off, phase R of the main current circuit 11 is here also applied to elements 3 and 4 via a line 14, switching contact 16" and line 15, so that switching element 2 is heated until it cuts off the main current circuit 11 when a predetermined limit temperature has been exceeded.

As mentioned above the load 9 controlled in this manner may be a number of different types of elements, e.g. a heater, a motor, etc. One particular application of the present invention as illustrated in FIGS. 1–4 is for the control of the injection cylinder of a synthetic material processing machine. In such a case, the load 9, i.e., the heated body, would be the injection cylinder whose temperature was monitored by the circuit 7,8 to control the current thereto.

It will be understood that the above description of the present invention is susceptible to various modifications, changes and adaptations, and the same are intended to be comprehended within the meaning and range of equivalents of the appended claims.

I claim:

1. In a circuit arrangement for supplying current to an electric power load, as for example, an electric heater, an electric motor and the like, said circuit arrangement including a main current circuit having said load and a power switching means for controlling the current to said load connected in series and a first means for controlling the opening and closing of said power switching means, the improvement comprising, in combination:

an automatic safety circuit means for monitoring said power switching means controlling the main current circuit to prevent damages to said load which might occur as a result of a malfunction of said power switching member causing it to remain closed when the main current to the load is to be cut off, said automatic safety circuit means including:

second means for disrupting said main current circuit when said second means is subjected to a control current therein; and auxiliary switch means, controlled by said first means and connected between said second means and a point of said main current circuit located between said load and said power switching means, for connecting said second means to said point so as to establish a control current path to said second means when said main current circuit is to be disrupted via said power switching means and the main current to said load cut off, to cause said second means to disrupt said main current circuit in the event said power switching means has not opened.

2. The apparatus as defined in claim 1 wherein said second means includes a normally closed switch connected in said main current circuit and circuit means connected to said auxiliary switch means and responsive to a current flow therein for opening said switch.

3. The apparatus as defined in claim 2 wherein said second means is an electromechanical switching means.

4. The apparatus as defined in claim 1 wherein said second means includes at least one resistance heating element connected between said auxiliary switch means and a different point of said main current circuit, and a normally closed heat responsive switching element connected in said main current circuit, said heat responsive switching element being in thermal contact with said resistance heating element and being responsive to the heat therefrom to open and disrupt the main current circuit when a predetermined temperature is exceeded.

5. The apparatus as defined in claim 4 wherein said heat responsive switching element is connected in said main current circuit on the side of said power switching means opposite that to which said load is connected.

6. The apparatus as defined in claim 5 wherein said resistance heating element is connected in parallel with said load when connected to said point between said load and said power switching means via said auxiliary switch means.

7. The apparatus as defined in claim 2 wherein said power switching means is a thyristor connected in series with said load in said main current circuit, and wherein said first means controls said auxiliary switch means to connect the control electrode of said thyristor via a resistor to said point in said main current circuit between said load and said power switching means when said thyristor is to be switched on to provide current flow through said load.

8. The apparatus as defined in claim 2 wherein said power switching means includes a relay having a pair of relay contacts connected in series with said load in said main current circuit and a relay coil connected in an auxiliary power circuit in parallel with said load and said relay contacts; and wherein said first means includes a switch connected in said auxiliary power circuit for controlling the power to said relay coil.

9. The apparatus as defined in claim 2 wherein said power switching means comprises a switch; wherein said first means is a manually operated switch control member; and wherein said auxiliary switch means is mechanically connected to said switch control member for movement therewith together with said switch comprising said power switching means.

10. The apparatus as defined in claim 1 wherein said first means comprises an automatic temperature control circuit means for monitoring the heat produced by said load and for cutting off said main current when a predetermined temperature has been reached.

11. The apparatus as defined in claim 10 wherein said automatic temperature control circuit includes an amplifier responsive to the temperature of the heat produced by said load and a relay coil responsive to the output of said amplifier, said relay coil controlling the condition of said power switching means and the position of said auxiliary switch means.

12. The apparatus as defined in claim 11 wherein said load is a heater.

* * * * *